United States Patent
Durin et al.

[11] Patent Number: 6,082,690
[45] Date of Patent: Jul. 4, 2000

[54] BRACKET FOR CONDUIT CARRIERS

[75] Inventors: Michel Durin, St. Cyr l'Ecole; Roland Boltz, Estrées St. Denis, both of France

[73] Assignee: Metal Deploye S.A., Monteard, France

[21] Appl. No.: 09/125,293

[22] PCT Filed: Dec. 11, 1997

[86] PCT No.: PCT/FR97/02266

§ 371 Date: Aug. 14, 1998

§ 102(e) Date: Aug. 14, 1998

[87] PCT Pub. No.: WO98/27630

PCT Pub. Date: Jun. 25, 1998

[30] Foreign Application Priority Data

Dec. 19, 1996 [FR] France ................................. 96 16005
Dec. 19, 1996 [FR] France ................................. 96 16006

[51] Int. Cl.[7] .................................................. E06B 7/28
[52] U.S. Cl. .................................. 248/241; 211/90.01
[58] Field of Search .................................. 248/241, 247, 248/248, 250, 235; 211/90.01

[56] References Cited

U.S. PATENT DOCUMENTS

| | | | |
|---|---|---|---|
| 663,784 | 12/1900 | Porter | 248/241 |
| 2,772,846 | 12/1956 | Skar | 248/243 |
| 2,837,219 | 6/1958 | Ferdinand et al. | 108/65 |
| 4,103,855 | 8/1978 | Grosse | 248/246 |
| 4,450,970 | 5/1984 | Shepherd | 211/189 |
| 5,297,486 | 3/1994 | Herrmann et al. | 108/108 |
| 5,318,264 | 6/1994 | Meiste | 248/221.41 |
| 5,346,077 | 9/1994 | Randall | 211/90.01 |

FOREIGN PATENT DOCUMENTS

| | | |
|---|---|---|
| 0 294 273 | 12/1988 | European Pat. Off. . |
| 2 697 690 | 5/1994 | France . |
| 2 726 697 | 5/1996 | France . |
| 26 26 735 | 12/1977 | Germany . |
| 88 01 512 | 3/1988 | Germany . |
| WO93/04612 | 3/1993 | WIPO . |

*Primary Examiner*—Anita M. King
*Attorney, Agent, or Firm*—Jacobson, Price, Holman & Stern, PLLC

[57] ABSTRACT

A bracket for cable tray type conduit carriers constituted by three principal perpendicular walls forming a trihedron, a dorsal wall, a fixing wall for fixing conduit carriers and a lateral wall. The bracket is mounted to a U-shaped rail via a rod passing through a perforation in one side member of the rail, a hole in the lateral wall, bearing on a projection in the dorsal wall and finally passing through a facing perforation of a second side member of the rail. The fixing wall is provided with a system of notches out across the edge between the fixing wall and the lateral wall, the notches dividing the fixing wall into separate islets and being surmounted by tongues provided in the fixing wall over a fraction of the length of the notches. Notches constitute housings for longitudinal wires of wire mesh cable trays, the tongues being able to be bent down onto the wires.

27 Claims, 6 Drawing Sheets

BRACKET FOR CONDUIT CARRIERS

FIELD OF THE INVENTION

The present invention relates to a bracket particularly but not exclusively for supporting and fixing conduit carriers for electrical cables, cables, conductors or flexible tubing of any type, such as fibre optics or fluid conduits.

DESCRIPTION OF THE RELATED ART

When installing electrical cables used in the most diverse of applications or, more generally, fluid conduits or flexible conductors, it is normal to use conduit carriers such as cable trays or cable ladders in which or on which the cables or the like are disposed.

More particularly but not exclusively, the bracket of the invention is intended for installing wire mesh cable trays and sheet metal cable trays. A non limiting example of such cable trays is given in European patent EP-A-0 298 825 for wire mesh cable trays and in French patent FR-A-1 573 264 for sheet metal cable trays.

To install cable trays at sites where they are to be mounted, brackets intended to support and fix them are disposed in known manner on the walls, surfaces or more generally on support structures along which the cable trays are to run.

Brackets for installing cable trays are already known, generally formed from sheet metal.

Such brackets include a fixing wall which is rectangular in shape to receive the cable tray, which is integral via each of its two long sides with a lateral wall perpendicular to the fixing wall. The two lateral walls are generally of the same dimensions and are disposed symmetrically with respect to a plane perpendicular to the fixing wall passing through the middle of the short sides of that wall.

The dimensions of such brackets, which are generally U-shaped, are such that they can be embedded by a short side of the rectangle of the fixing wall inside a U-shaped rail acting as a support structure on which the bracket is to be fixed, the fixing wall being perpendicular to the axis of the U-shaped rail, the bracket being mounted so as to project from the rail, with the rail being located vertically on a wall, for example.

The dimensions of the lateral walls are calculated as a function of the forces to be tolerated and the lateral walls are generally in the form of a rectangular trapezium with its long base applied against the floor of the U-shaped rail when the bracket is in position in the rail.

For mounting on the rail, each of the lateral walls includes at least one perforation located close to the long base of the trapezium and to the fixing wall, the perforations being opposite each other on the respective lateral walls to enable a pin to be passed through, the pin also passing through facing regularly spaced s perforations provided on the side members of the rail to enable the bracket to be mounted on the rail.

A bracket as described above requires the presence of a rail or an equivalent structure for mounting it.

Other types of brackets are known which are exclusively intended for direct mounting on a wall or a beam and which cannot be mounted inside a U-shaped rail; they include at least one dorsal wall pierced with holes for bolting directly to a wall.

One aim of the present invention is to provide brackets which are more economical than the traditional brackets described above, being easy to manufacture and in particular minimising the amount of material to be used while having the necessary rigidity to support conduit carriers.

A further aim is to provide a bracket which, in contrast to the brackets described above, is suitable both for cantilevering on by embedding in a perforated U-shaped rail type upright and for mounting directly on a wall partition, thus avoiding the need to hold in stock and to manufacture different brackets depending on their type of fixing.

A still further aim is to provide brackets onto which the conduit carriers can easily be fixed.

A still further aim is to provide a bracket which above all can be used to fix wire mesh cable trays but which, with a minimum of adaptation, can be used as readily for wire mesh cable trays as for sheet metal cable trays.

SUMMARY OF THE INVENTION

In accordance with the invention, a bracket intended particularly to support conduit carriers is constituted by a bent sheet and can be cantilevered on by embedding in a U-shaped rail type upright comprising on each of its side members facing perforations which are generally regularly spaced along its length for passage of a rod or any equivalent means for mounting the bracket in the rail, such as a pin, a key or the like.

The bracket is provided with a fixing wall comprising means for supporting and/or fixing conduit carriers or other articles for which the bracket can be used. It also comprises a single lateral wall located along one side only, along the fixing wall, the geometry of the lateral wall being such that on mounting the bracket in the rail it can tolerate the forces to which the fixing wall is subjected, and a dorsal wall, having dimensions such that it can engage inside the rail with the desired allowances. The fixing wall, the lateral wall and the dorsal wall form a trihedron with two of its three edges being constituted by bends in the sheet metal so as to pass from one wall to another.

The dorsal wall comprises a projection towards the interior of the trihedron, which projection is located close to the fixing wall and distant from the lateral wall and which constitutes a rest, with or without a through passage, for a rod forming a means for mounting the bracket on the rail, the lateral wall comprising a hole for passage of that rod.

The hole and projection are disposed so that a rod engaged in the hole and in two facing perforations on the two side members of the rail will bear on the projection and thus maintain the dorsal wall of the bracket inside the rail, the lateral wall being engaged inside the rail, thus embedding the bracket in the rail.

Preferably, the lateral wall connects the fixing wall and the dorsal wall, passage from the lateral wall to the dorsal wall and from the lateral wall to the fixing wall being ensured by bends in the sheet metal.

Preferably, the dihedral angles formed at the three edges of the trihedron are right angles.

The width of the fixing wall is, of course, such that it can be engaged inside the rail. However, the width of the fixing wall close to the dorsal wall will not necessarily be identical to the width of the dorsal wall: for reasons of economy, it could be narrower than that of the dorsal wall.

The projection located on 'the dorsal wall can be formed by any means constituting a bearing zone for a rod acting as a means for mounting a bracket in a rail. The bearing zone may or may not comprise a through passage, for example a hole, for the rod.

The projection may, for example, be constituted by a cold deformation in the dorsal wall or by a cut-out or by adding and fixing a part of the desired shape to the dorsal wall.

The projection is preferably constituted by a tab in the form of a quadrilateral of the desired length, cut out at the desired position in the dorsal wall of the bracket then advantageously bent at a right angle to the dorsal wall, the bearing zone being constituted by the free edge of the tab opposite the dorsal wall.

In a particular embodiment, the free bearing edge of the tab is constituted by the portion of the edge of the dorsal wall opposite the lateral wall, the corresponding tab preferably being bent at a right angle; thus the cutting out of the tab is reduced to two edges instead of three.

The free edge constituting the projection may or may not comprise a notch or a hole for positioning a rod therein.

The projection bearing zone can advantageously constitute a bearing cam, the height of the projection with respect to the dorsal wall increasing on approaching the fixing wall.

Advantageously, the hole located in the lateral wall for passage of a rod can be oblong in shape with its long axis parallel to the bearing edge of the projection. When the bearing zone comprises a cam as described above, the long axis of the oblong hole is inclined in a direction substantially identical to that of the cam. In this way, the inclination of the cam and the oblong hole enables the dorsal wall to bear on the floor of the rail by sliding the hole and projection on a rod to adjust any play and/or to adapt the bracket to the disposition and to the shape of the perforations in the rail side members.

Optionally, the lateral wall can also comprise a second hole close to the dorsal wall but at a distance from the fixing wall, which secures the mounting of the bracket on the rail, a complementary mounting means such as a bolt being passed through the second hole of the lateral wall and through a corresponding perforation in the rail running alongside the lateral wall.

Very advantageously, in order to be able to use the console for direct mounting as well, i.e., without using a rail type upright, the dorsal wall is provided with at least one hole to enable known complementary mounting means such as a bolt to be used. Thus the bracket can be mounted directly on a wall, beam or the like.

The dorsal wall of the bracket preferably has a second hole located a distance below the hole defined above.

The bracket can be mechanically stiffened or reinforced with one or more beads, ribs, laps or deformations in the metal at appropriate locations, enabling a thin sheet to be used to manufacture the bracket.

The length of the fixing wall of the bracket of the invention is adapted to the width of the conduit carriers to be supported and is provided with means which can themselves or with the use of complementary means be used to fix the conduit carriers. These means can, for example, be bolt means, hook means or any other equivalent means.

The means for fixing the conduit carriers on the fixing wall comprises a means for hooking a conduit carrier constituted by a mesh of longitudinal and transverse wires.

To this end, in a first particular embodiment of the invention, the fixing wall of the bracket comprises a system of notches cut across the fixing wall and into the extremities of the lateral wall and a continuous flange of the fixing wall, the flange being formed on the longitudinal side opposite to that of the lateral wall and of a sufficient height to contain the notches.

In a second particular embodiment of the invention, the fixing wall comprises a free edge at the longitudinal side opposite to that of the lateral wall and a system of notches cut across the fixing wall and into the extremities of the lateral wall, the notches thus dividing the fixing wall into islets.

In one or other embodiment, the notches are covered over a fraction of their length with tongues formed in the fixing wall, the dimensions of the space left free on the fixing wall being sufficient to allow the passage of the longitudinal wires of wire mesh conduit carriers.

Such notches and tongues constitute housings; their dimensions and spacing on the fixing wall can be adapted to receive the longitudinal wires of conduit carriers constituted by a wire mesh, by simple nesting. The tongues may or may not be bent down onto the wires to anchor the conduit carriers to the bracket.

When the tongue is not bent down, the notch and tongue assembly constitutes housings for the longitudinal wires of wire mesh conduit carriers, each tongue extending the corresponding housing.

Tongues which are not bent down on the longitudinal wires of the conduit carriers are advantageously disposed so as not to project with respect to the fixing wall.

Depending on the width of the fixing wall, the tongues for each notch can be formed in one or more parts and can be wider or narrower.

Preferably, when they are narrower than the fixing wall, the tongues are not located half way across the width of the fixing wall but close to the lateral wall, mainly to reduce the couple which could deform the fixing wall when bending the tongues down.

Advantageously, in the second particular embodiment of the invention, each sheet metal islet can be stiffened by a very short shoulder on the side of the free edge opposite the lateral wall.

It should be noted that, in the second particular embodiment of the invention, pairs of brackets immobilise elements of conduit carriers located between them, the longitudinal wires of the conduit carriers passing through a simple series of notches cut in the single lateral wall of each bracket.

Advantageously and independently of the embodiments of the invention described above, the fixing wall may comprise a second means for fixing the conduit carriers on the bracket. This second fixing means is intended, either alone or with the aid of complementary means not connected to the bracket, to use the bracket of the invention to support and fix conduit carriers other than wire mesh conduit carriers such as, for example, perforated sheet metal conduit carriers or to fix pendants or threaded rods or anything intended to be positioned on the bracket.

Preferably, the second fixing means is constituted by at least one perforation, advantageously oblong in shape, located on the uncut portions of the fixing wall between the notches.

The complementary fixing means not connected with the bracket may, for example, be constituted by bolts.

Optionally, the portion of the fixing wall which is closest to the dorsal wall may be extended by a tab bent against the outer face of the dorsal wall thus acting to stiffen the fixing wall, the dihedral angle between the lateral wall and the dorsal wall and that between the fixing wall and the dorsal wall.

In order that the bent tab does not make the dorsal wall excessively thick, a portion of the latter close to the fixing wall and coming into contact with the tab can be slightly indented towards the inside of the bracket over a depth equal to the thickness of the sheet.

In this fashion, the bracket of the invention is of universal use.

Advantageously, the bracket of the invention is produced by cutting a developed shape of the bracket from a metal sheet then bending, the shape being repeated in the metal sheet as a periodic pattern so as to minimise waste loss and the quantity of material to be used. Between cutting and bending, an embossing operation can optionally complete production of the different portions of the bracket.

BRIEF DESCRIPTION OF THE DRAWINGS

The accompanying figures give a detailed but non limiting description of two particular embodiments of a bracket of the invention and examples of fixing various types of able trays on the brackets obtained.

DETAILED DESCRIPTION OF THE INVENTION

Figure 1:
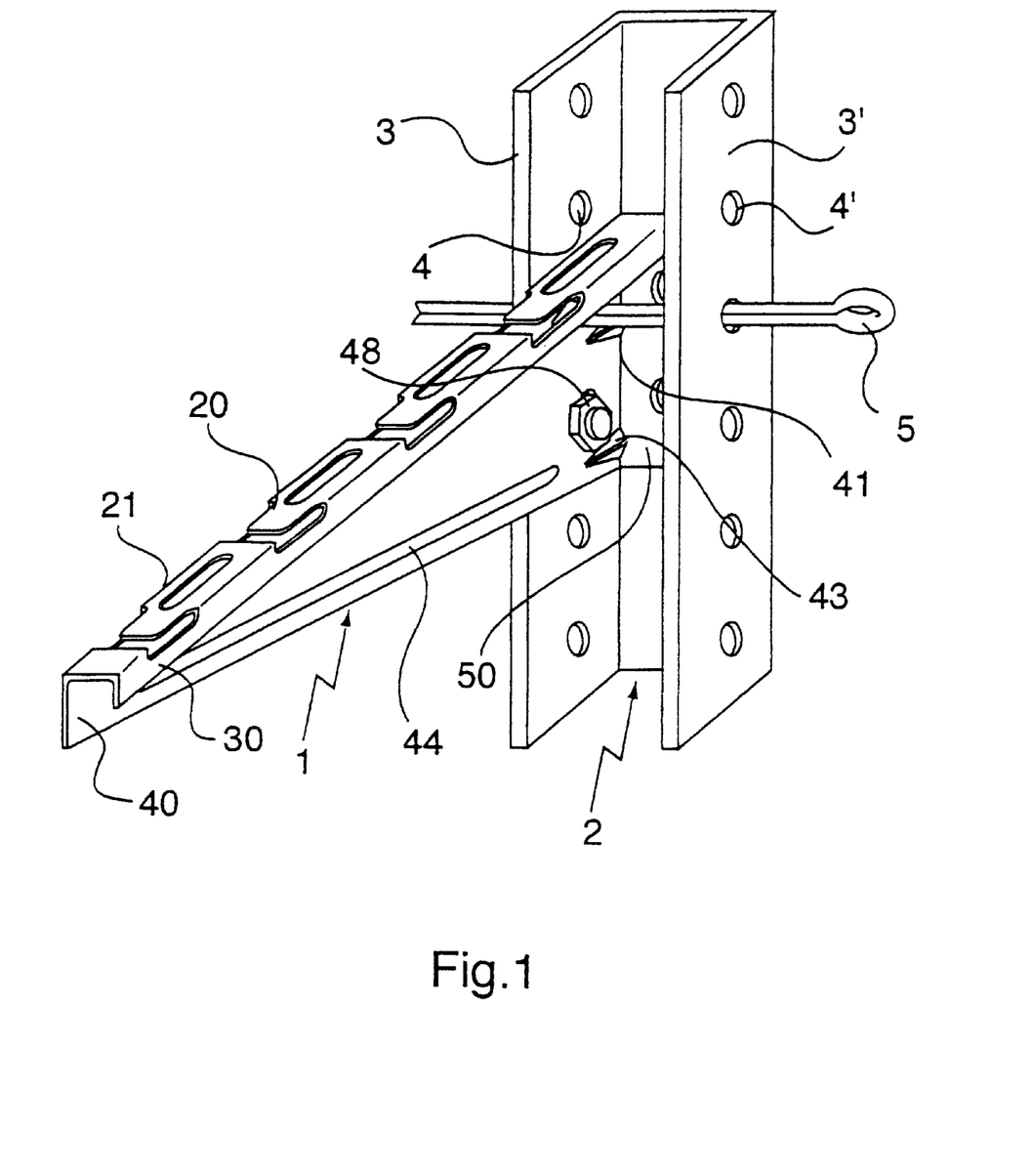
FIG. 1 is a perspective view of a first embodiment of a bracket of the invention, embedded in a vertically disposed U-shaped rail.

FIG. 1 shows a bracket 1 of the invention constituted by cut and bent sheet metal cantilevered on by being embedded in a U-shaped rail 2, each of its two side members 3 and 3' having regularly spaced perforations 4 and 4' for the passage of a pin type rod 5 perpendicular to side members 3 and 3' to mount 30 bracket 1 on rail 2.

The bracket 1 of the invention is provided with a rectangular fixing wall 20; it also comprises a single lateral wall 40 in the form of a rectangular trapezium located to one side only along the fixing wall 20 and a dorsal wall 50 in the form of a rectangle the width of which is such that it can engage inside rail 2 with a small allowance.

Fixing wall 20, lateral wall 40 and dorsal wall 50 form a right angled trihedron, bends 21 and 41 in the sheet metal ensuring passage from the fixing wall to the lateral wall and from the lateral wall to the dorsal wall respectively, the lateral wall connecting the fixing wall to the dorsal wall.

Bend 21 constitutes both the long side of the rectangle forming fixing wall 20 and the height of the rectangular trapezium forming lateral wall 40.

Bend 41 constitutes both the long side of the rectangle forming dorsal wall 50 and the long base of the rectangular trapezium forming lateral wall 40.

Figure 2:
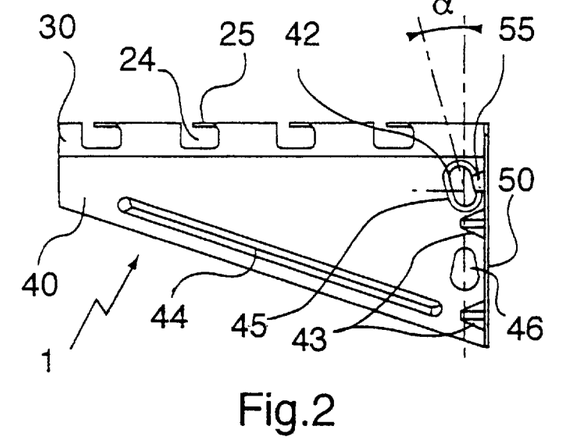
FIG. 2 shows a front view of the bracket of FIG. 1.
Figure 3:
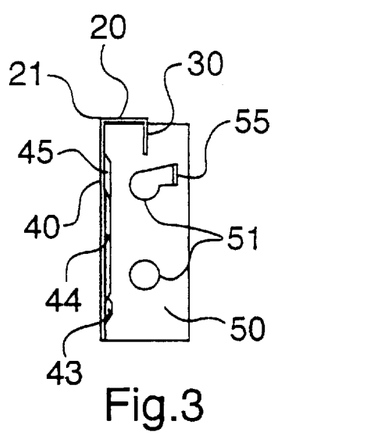
FIG. 3 is a left side view of the bracket of FIG. 1.
Figure 4:
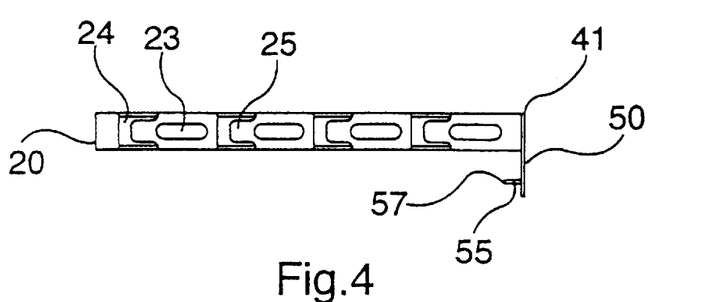
FIG. 4 is a top view of the bracket of FIG. 1.

FIGS. 2, 3 and 4 illustrate more precisely the means on bracket 1 enabling it to be mounted on rail 2 or directly on a wall.

Dorsal wall 50 comprises a tab 55 located close to fixing wall 20 and directed towards the interior of the trihedron formed by walls 20, 40 and 50 of bracket 1. This tab 55, perpendicular to dorsal wall 50 and parallel to lateral wall 40, is disposed close to the edge of the dorsal wall opposite bend 41 and has a free edge 57 opposite the dorsal wall. Free edge 57 thus constitutes a bearing projection for split pin 5 which mounts bracket 1 on rail 2, the pin passing through two facing perforations 4 and 4' on rail 2 and through a hole 42 pierced in lateral wall 40.

Tab 55 and hole 42 are disposed with respect to the walls of the trihedron so that pin 5 passed through perforations 4 and 4', hole 42 and bearing on edge 57, applies dorsal wall 50 of bracket 1 against the floor of rail 2, lateral wall 40 being engaged against one side member 3 of rail 2, to ensure that bracket 1 is embedded in rail 2.

Tab 55 is generally in the form of a quadrilateral and is advantageously obtained by cutting three edges in dorsal wall 50 and bending at a right angle about the uncut edge 56.

Bearing edge 57 of tab 55 is not parallel to bend 56 nor to bend 41 but forms an angle α with them, for example of the order of 15°, the distance of a point of edge 57 to dorsal wall 50 increasing as the fixing wall is approached.

Hole 42 in lateral wall 40 is oblong in shape with its long axis parallel to bearing edge 57, and thus also forms an angle α with edge 41.

Thus edge 57 forms a bearing cam for pin 5, the weight of the cable trays and bracket 1 itself tending to apply bracket 1 against the floor of rail 2 and adapting it to small geometrical variations in perforations 4,4'.

Hole 42 has a beaded edge in the form of collar 45 perpendicular to the lateral wall from which it issues; thus on mounting, pin 5 exerts a pressure which is distributed over a larger surface than that defined by the thickness of the sheet metal.

Once pin 5 has passed through, its free end can be bent to prevent it from subsequently jumping out; pin 5 is not bent in FIG. 1.

Highly advantageously, the cross section of pin 5 is not circular in the portion which passes into oblong hole 42 and bearing edge 57 of the projection, the minimum diameter and maximum diameter of pin 5 here being respectively a little smaller and a little larger than the width of oblong hole 42; thus once pin 5 has passed through the various holes and perforations, rotating it by a quarter turn locks it against the edge of the oblong hole and against bearing edge 57 of the projection and prevents it from jumping out subsequently.

Lateral wall 40 also has a hole 46, generally in the form of a rounded triangle, below hole 42 at a suitable distance from hole 42 and dorsal wall 50 to allow a bolt 48 to pass through the hole and one of perforations 4 of one side member 3 of rail 2 to secure the mounting of bracket 1 to rail 2, if required.

Dorsal wall 50 also has two superposed holes 51 distanced from each other to allow the passage of means such as mounting bolts to mount the bracket directly on a wall, a beam or the like. This is thus an alternative means of mounting the bracket without embedding it in a rail.

The right dihedral angle between lateral wall 40 and dorsal wall 50 is stiffened by two bosses 43.

Lateral wall 40, which is intended to transmit the weight of the conduit carriers to dorsal wall 50 (applied to the floor of rail 2), is reinforced, to prevent it from buckling, by embossed rib 44.

Fixing wall 20 is narrower than dorsal wall 50 which on the one hand enables bracket 1 to be embedded in rail 2 and on the other hand economises on sheet metal surface area. The length of the long side of fixing wall 20 is adapted to the width of the element or elements of the conduit carriers to be supported.

The long side of the fixing wall opposite bend 21 is provided with a continuous flange 30 of suitable constant height obtained by bending the suitably dimensioned free edge of the fixing wall inwardly at a right angle.

The fixing wall 20 is also provided with means for fixing conduit carriers.

To this end, half way across it, the fixing wall has oblong shaped perforations 23 for fixing cable trays, for example, in particular of the perforated sheet metal type by bolting.

Figure 6:
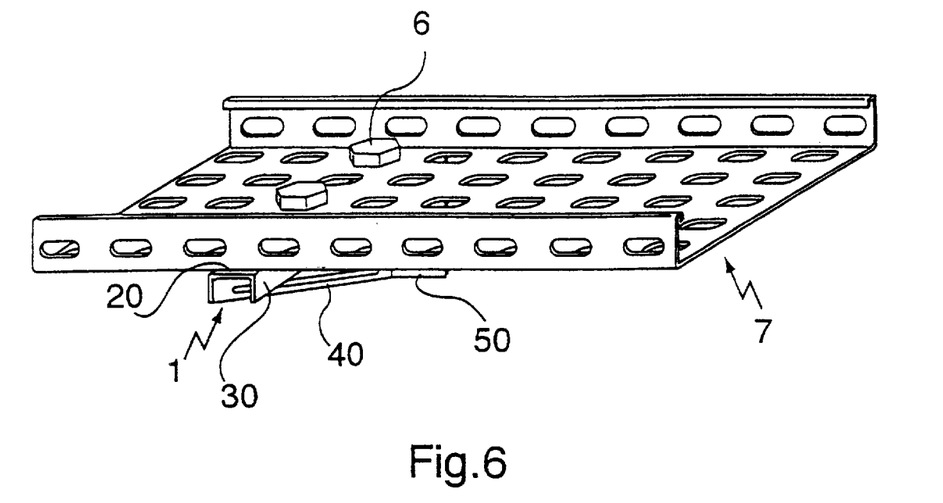
FIG. 6 shows fixing of a perforated sheet metal cable tray on the bracket of FIG. 1 by bolting. For simplification, the bracket is not shown mounted on a rail or wall.

FIG. 6 shows such a perforated sheet metal cable tray 7 fixed to bracket 1: the bolts pass through perforations 23 in bracket 1 and the perforations in the floor of cable tray 7 to fix these two elements together, the frequency of repetition of perforations 23 corresponding to the spacing of the perforations in the floor of cable tray 7.

Bracket 1 also includes a system of notches 24 cut across fixing wall 20, into the extremities of lateral wall 40 and flange 30, notches 24 being surmounted by tongues formed in fixing wall 20 over a fraction of the length of notches 24, which fraction allows the longitudinal wires of cable trays to be located on the brackets to pass freely into the notches.

Figure 7:
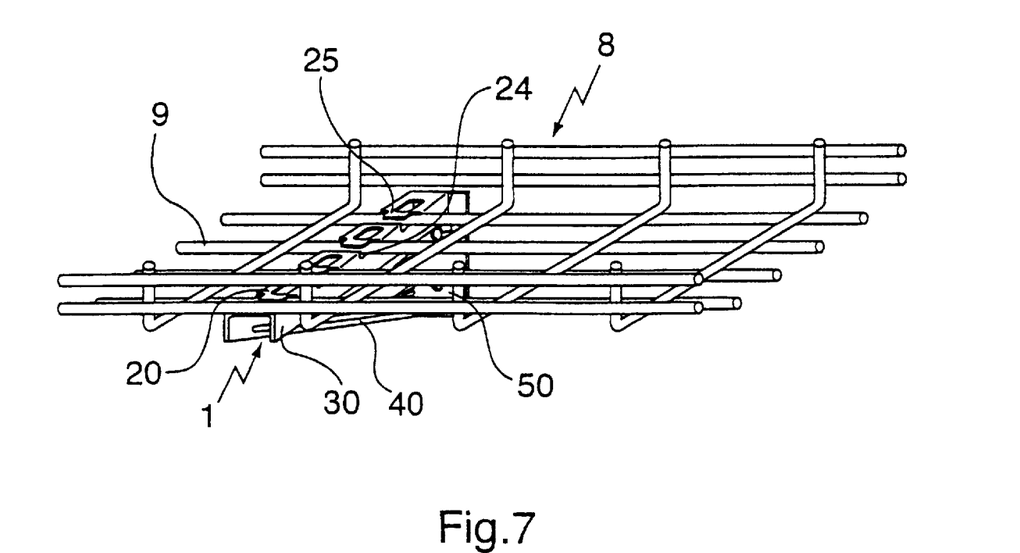
FIG. 7 shows fixing of a wire mesh cable tray on the bracket of FIG. 1 by nesting. For plication, the bracket is not shown mounted on a rail or wall.

As shown in FIG. 7, these notches 24 and tongues 25 constitute housings for longitudinal wires 9 of cable tray 8 formed from a wire mesh, the frequency of repetition of the notches being adapted to the spacing of longitudinal wires 9.

After inserting wires 9 into notches 24, tongues 25 can be bent down onto wires 9 to anchor cable trays 8 to fixing wall 20; FIG. 7 does not show tongues 25 bent down onto wires 9.

Figure 5:
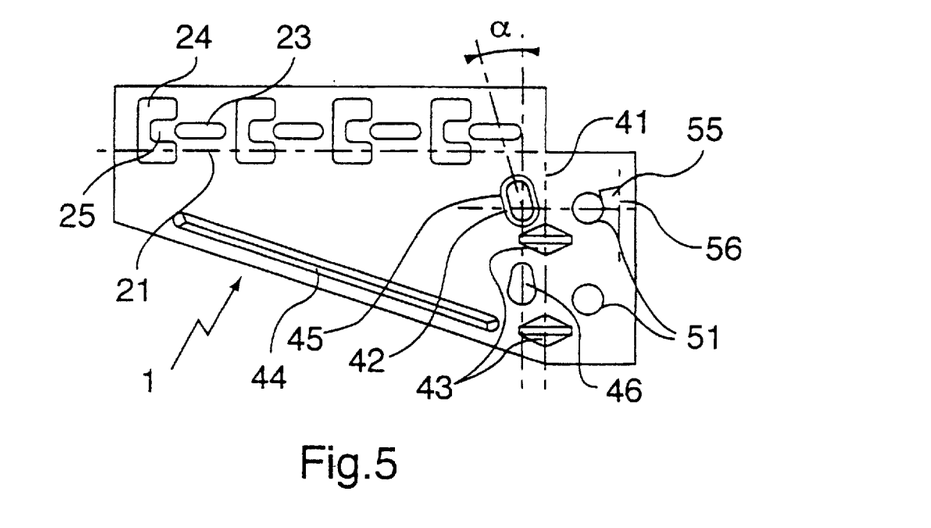
FIG. 5 shows the developed shape of the bracket of FIG. 1 with the location of cut-o and indents to mass produce the bracket from sheet metal.

FIG. 5 shows a method of manufacture of bracket 1 by cutting and bending a developed shape from sheet metal. The shape shown in FIG. 5 is repeated as a periodic pattern in the sheet metal to minimise waste loss and the quantity of material to be used and includes the disposition of all of the cut-outs and embossing required to form bracket 1.

Figure 8:
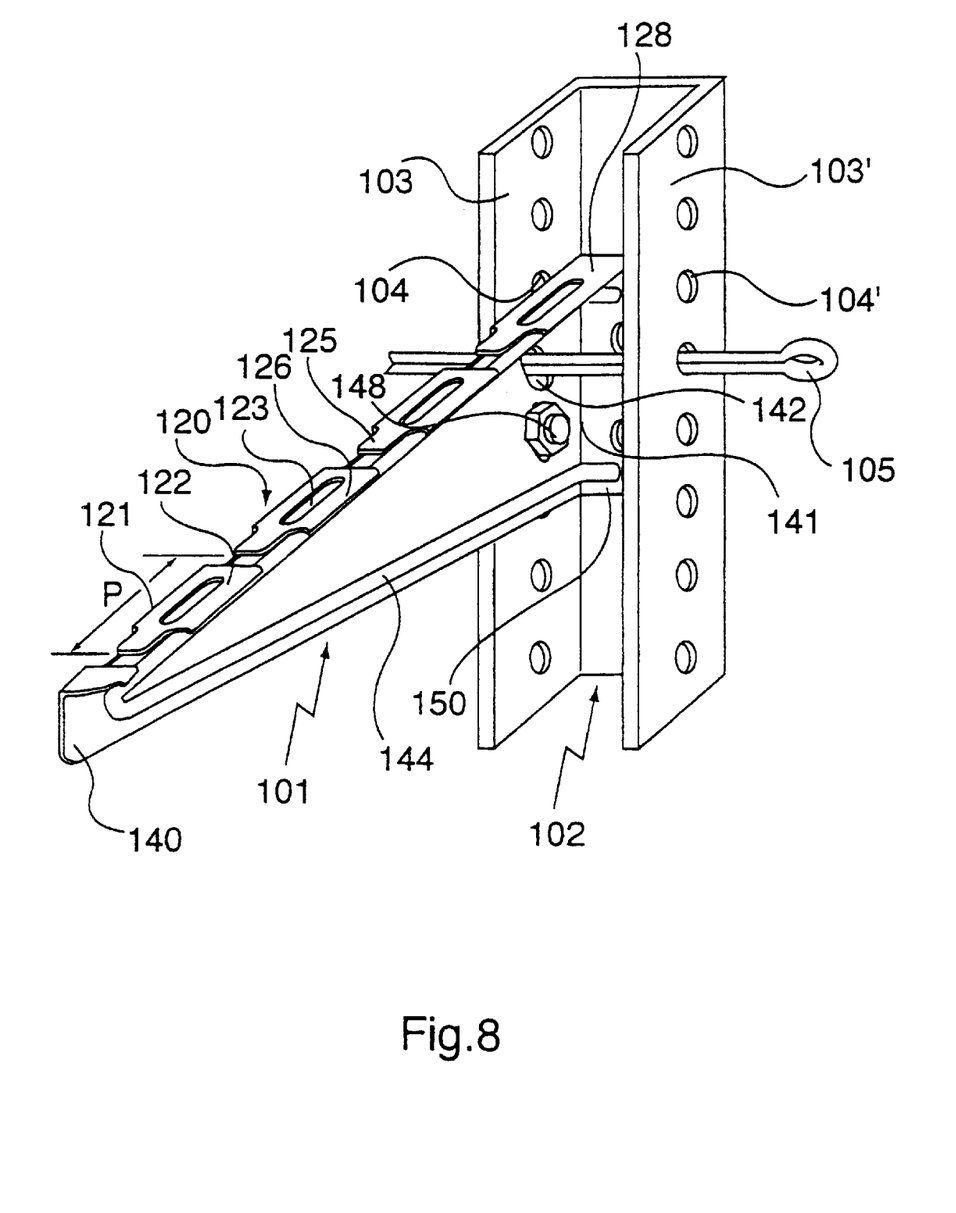
FIG. 8 is Perspective view of a second embodiment of a bracket of the invention, embedded in a vertically disposed U-shaped rail.

FIG. 8 shows a further bracket 101 of the invention constituted by cut and bent sheet metal cantilevered on and embedded in an upright 102 formed as a U-shaped rail, each of its two side members 103 and 103' having regularly spaced perforations 104 and 104'.

The bracket 101 of the invention is provided with a rectangular fixing wall 120; it also comprises a single lateral wall 140 in the form of a rectangular trapezium located to one side only along the fixing wall 120 and a dorsal wall 150 in the form of a rectangle the width of which is such that it can engage inside rail 102 with a small allowance, the width of fixing wall 120 being less than that of dorsal wall 150.

Fixing wall 120, lateral wall 140 and dorsal wall 150 form a right angled trihedron, bends 121 and 141 in the sheet metal ensuring passage from the fixing wall to the lateral wall and from the lateral wall to the dorsal wall respectively, the lateral wall connecting the fixing wall to the dorsal wall.

Bend 121 constitutes both the long side of the rectangle forming fixing wall 120 and the height of the rectangular trapezium forming lateral wall 140.

Bend 141 constitutes both the long side of the rectangle forming dorsal wall 150 and the long base of the rectangular trapezium forming lateral wall 140.

Figures 9, 10:
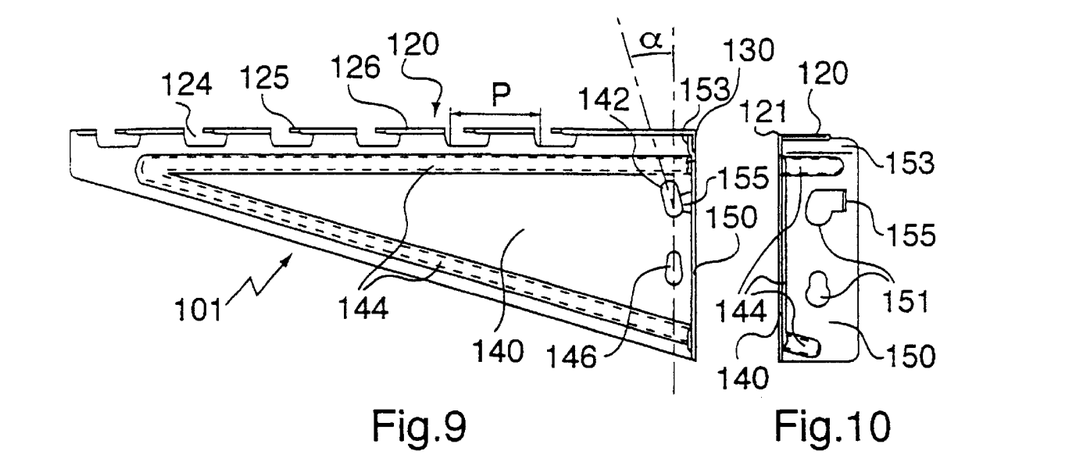
FIG. 9 shows a front view of the bracket of FIG. 8.
FIG. 10 is a left side view of the bracket of FIG. 8.
Figure 11:
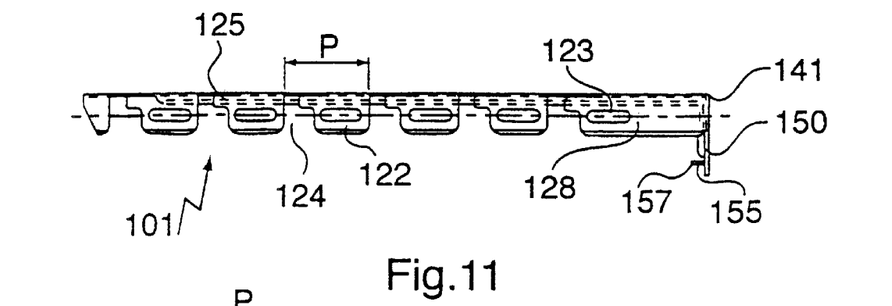
FIG. 11 is a top view of the bracket of FIG. 8.

FIGS. 9, 10 and 11 illustrate more precisely the means on bracket 101 enabling it to be mounted on rail 102 or directly on a wall.

Dorsal wall 150 comprises a tab 155 located close to fixing wall 120 and directed towards the interior of the trihedron formed by walls 120, 140 and 150 of bracket 101. This tab 155, perpendicular to dorsal wall 150 and parallel to lateral wall 140, is located close to the edge of the dorsal wall opposite bend 141 and has a free edge 157 opposite the dorsal wall. Free edge 157 thus constitutes a bearing projection for split pin 105 which mounts bracket 101 on rail 102, the pin passing through two facing perforations 104 and 104' on rail 102 and through a hole 142 pierced in lateral wall 140.

Tab 155 and hole 142 are disposed with respect to the walls of the trihedron so that pin 105, passed through perforations 104 and 104', hole 142 and bearing on edge 157, applies dorsal wall 150 of bracket 101 against the floor of rail 102, lateral wall 140 being engaged against one side member 103 of rail 102, to ensure that bracket 101 is embedded in rail 102.

Tab 155 is generally in the form of a quadrilateral and is advantageously obtained by cutting three edges in dorsal wall 150 and bending at a right angle about the uncut edge 156.

Bearing edge 157 of tab 155 is not parallel to bend 156 nor to bend 141 but forms an angle $\alpha$ with them, for example of the order of 15°, the distance of a point on edge 157 to dorsal wall 150 increasing as the fixing wall is approached.

Hole 142 in lateral wall 140 is oblong in shape with its long axis parallel to bearing edge 157, and thus also forms an angle $\alpha$ with edge 141.

Thus edge 157 forms a bearing cam for pin 105, the weight of the cable trays and bracket 101 itself tending to apply bracket 101 against the floor of rail 102 and adapting it to small geometrical variations in perforations 104, 104'.

Lateral wall 140 also has a hole 146, generally in the form of a rounded triangle, below hole 142 at a suitable distance from hole 142 and dorsal wall 150. A bolt 148 passes through the hole and one perforation 104 of side member 103 of rail 102 to secure the mounting of bracket 101 to rail 102, if required.

Dorsal wall 150 of bracket 101 also has two superposed holes 151 distanced from each other to allow the passage of screws or bolts to mount bracket 101 directly on a wall or beam. This is thus an alternative means of mounting the bracket without embedding it in a rail.

Lateral wall 140, which is intended to transmit the weight of the conduit carriers to dorsal wall 150, is reinforced, to prevent it from buckling, by embossed ribs 144 which extend along dorsal wall 150.

Ribs 144 also stiffen the right dihedral angle between dorsal wall 150 and lateral wall 140.

FIGS. 9 to 11 also show a variation to stiffen the same angle and that between fixing wall 120 and dorsal wall 150.

To this end, portion 128 of fixing wall contiguous with dorsal wall 150 is extended beyond dorsal wall 150 by a tab 130 bent at a right angle over the top of dorsal wall 150.

To prevent any excessive thickness from interfering with mounting of bracket 101, the upper portion 153 of dorsal wall 150 coming into contact with bent tab 130 is slightly indented to the interior of the bracket by a depth equal to the thickness of the sheet metal of the bracket.

Figure 12:
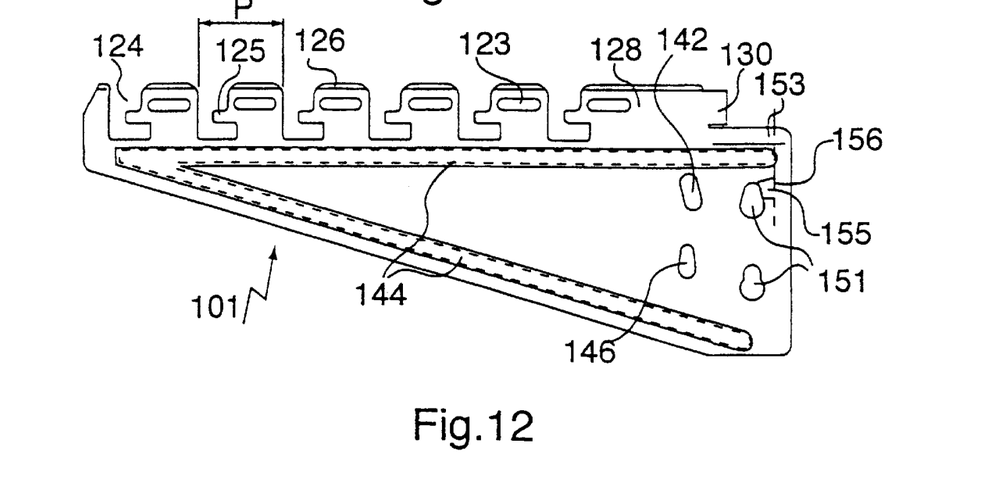
FIG. 12 shows the developed shape of the bracket of FIG. 8 with the location of cut-outs to mass produce the bracket from sheet metal.

FIG. 12 shows a method of manufacture of bracket 101 by cutting and bending a developed shape from sheet metal. The shape shown in FIG. 12 is repeated as a periodic pattern in the sheet metal to minimise waste loss and the quantity of material to be used and includes the disposition of all of the cut-outs and embossing required to form bracket 101.

In order to mount cable trays on fixing wall 120 of bracket 101, notches 124 are disposed periodically with spacing P along bend 121 and are cut across bend 121 across the whole width of fixing wall 120 to divide the latter into islets 122, the side opposite bend 121 being a free edge.

Notches 124 delimit periodic voids of generally rectangular shape in lateral wall 140 along edge 121 and are surmounted by tongues 125 extending each islet 122, these tongues being provided over a fraction of the length of notches 124, which fraction allows the longitudinal wires 109 (FIG. 14) of wire mesh cable trays to be introduced.

Figure 14:
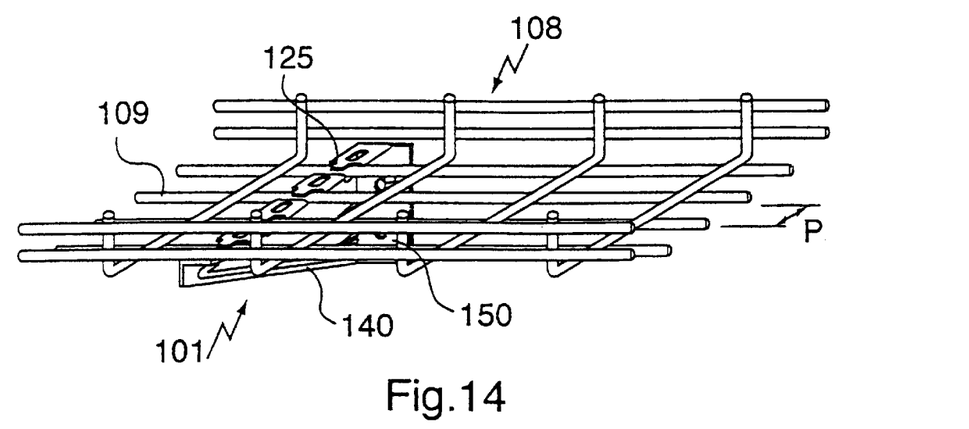
FIG. 14 shows fixing of a wire mesh cable tray on the bracket of FIG. 8 by nesting in. For simplification, the bracket is not shown mounted on a rail or wall.

Notches 124 and tongues 125 thus constitute housings for longitudinal wires 109 of wire mesh cable trays, the frequency of repetition P of the notches corresponding to the spacing of longitudinal wires 109.

Figure 15:
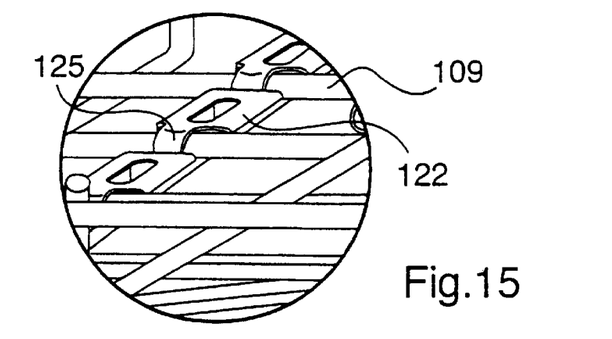
FIG. 15 shows a detail of a method of fixing the cable tray shown in FIG. 14.

After inserting wires 109 into notches 124, tongues 125 can be bent down onto wires 109 as shown in FIG. 15 to prevent them from leaving the housing.

Tongues 125 are located close to edge 121 in a position so that they can be bent down without abutting against edge 121.

Tongues 125 not bent down on longitudinal wires 109 of the cable trays do not project with respect to fixing wall 120 and do not risk damaging cables which may be contained in cable trays 108.

The bracket has a second means for fixing the cable trays described above.

At the centre of each islet 122 is an oblong perforation 123 the long axis of which is parallel to the long side of fixing wall 120; perforations 123 are thus repeated along the spacing P, along the fixing wall half way across it.

Figure 13:
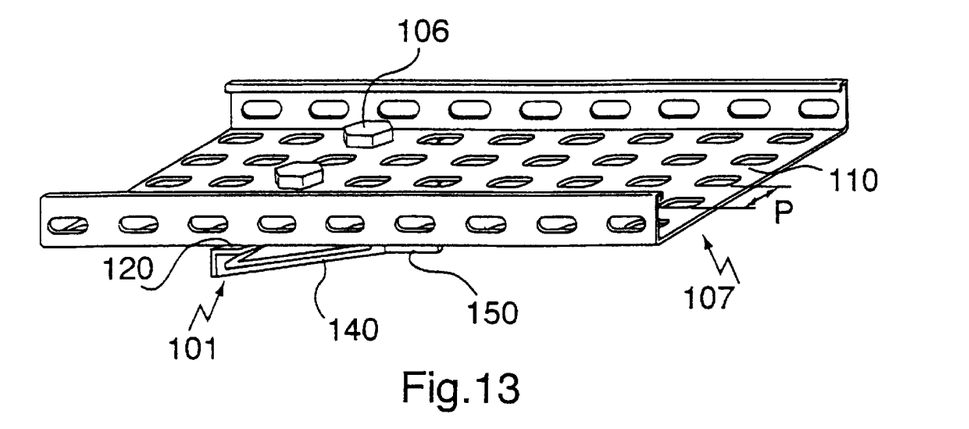
FIG. 13 shows fixing of a perforated sheet metal cable tray on the bracket of FIG. 8 by bolting. For simplification, the bracket is not shown mounted on a rail or wall.

FIG. 13 shows perforations 123 for fixing a perforated sheet metal cable tray 107 using bolts 106 passing through perforations facing the fixing wall surface and the dorsal wall of the cable tray.

The free edge of the islets opposite edge 121 is bent at a right angle towards the interior of the trihedron formed by the bracket walls over a very small height of the order of 2 mm to form a very narrow bead 126, which longitudinally stiffens islets 122 by increasing their moment of inertia.

Further, the contours of each islet 122 constituting fixing wall 120 are rounded to prevent injury, in particular during mounting.

A number of variations can be made to the bracket of the invention within the scope of the invention as claimed.

What is claimed is:

1. A bracket particularly for conduit carriers, constituted by bent sheet metal, intended to be embedded in a U-shaped rail type upright the side members and of which have facing perforations, the bracket being provided with a fixing wall, characterized in that the bracket comprises a single lateral wall and a dorsal wall with dimensions such that the bracket can engage inside the rail, the fixing wall, lateral wall and dorsal wall forming a trihedron two edges of which are constituted by bends in the sheet metal ensuring passage from one wall to another wall, in that the dorsal wall comprises a projection towards the inside of the trihedron, the projection being located close to the fixing wall and distanced from the lateral wall, said projection constituting a rest for a rod forming a means for mounting the bracket on the rail, and in that the lateral wall comprises a hole through which said rod can pass, the hole and the projection being disposed so that said rod, engaged in two facing perforations in two side members of the rail, maintains the dorsal wall of the bracket inside the rail.

2. A bracket according to claim 1, wherein the lateral wall forms a connection between the fixing wall and the dorsal wall.

3. A bracket according to claim 1, wherein dihedral angles formed at three edges of the trihedron are right angles.

4. A bracket according to claim 1, wherein the projection constituting a rest for the rod comprises a through passage for said rod.

5. A bracket according to claim 1, wherein said projection is constituted by a free edge of a tab cut in the dorsal wall and bent, the free edge forming a bearing zone for the rod for mounting the bracket, on the rail.

6. A bracket according to claim 1 wherein a bearing zone of the projection constitutes a cam, the height of the projection with respect to the dorsal wall increasing as the fixing wall is approached and in that the hole located on the lateral wall for passage of said rod is oblong in shape, and having an inclination of a long axis which is substantially identical to that of the cam.

7. A bracket according to claim 1, wherein an the edge of the hole in the lateral wall is bent in the form of a collar perpendicular to the lateral wall.

8. A bracket according to claim 1, wherein the lateral wall is provided with a second hole located close to the dorsal wall but at a distance from the hole first to secure mounting of the bracket on the rail by passing a fastener through the second hole and through a corresponding perforation in the side member of the rail on which the lateral wall bears.

9. A bracket according to claim 1, wherein the dorsal wall is provided with at least one hole enabling a mounting means to be passed directly from the bracket to a support structure.

10. A bracket according to claim 1, wherein the fixing wall is narrower than the dorsal wall.

11. A bracket according to claim 1, wherein the fixing wall is provided with a means for fixing wire mesh conduit carriers.

12. A bracket according to claim 11, wherein said means for fixing wire mesh conduit carriers to the fixing wall comprises a system of notches cut across the fixing wall and into the extremities of the lateral wall and a continuous flange of the fixing wall formed on the opposite side to the lateral wall, said notches being surmounted by tongues formed in the fixing wall over a fraction of the length of the notches, the dimensions and spacing of said notches on said fixing wall being such that they constitute housings to receive longitudinal wires of wire mesh conduit carriers, the edges of each notch on the fixing wall constituting each tongue which can be bent down onto a longitudinal wire engaged in said notch.

13. A bracket according to claim 12, wherein over a certain length, an edge of each notch forming said tongue has a width which is less than that of the fixing wall.

14. A bracket according to claim 13, wherein the edge of each notch on the fixing wall forming said tongue is located close to the lateral wall.

15. A bracket according to claim 11 wherein said means for fixing wire mesh conduit carriers to the fixing wall comprises a free edge on the longitudinal side opposite to the lateral wall and a system of notches cut across the fixing wall and into the extremities of the lateral wall, said notches being surmounted by tongues formed in the fixing wall over a fraction of the length of the notches, the dimensions and spacing of said notches on said fixing wall being such that they constitute housings to receive longitudinal wires of wire mesh conduit carriers, the edges of each notch on the fixing wall constituting said tongue which can be bent down onto a longitudinal wire engaged in said notch.

16. A bracket according to claim 15, wherein a very narrow bead is formed on islets in the fixing wall along a free edge opposite the lateral wall. certain length, an edge of each notch forming said tongue has a width which is less than that of the fixing wall.

17. A bracket according to claim 15 wherein over a certain length, an edge of each notch forming said tongue has a width which is less that that of the fixing wall.

18. A bracket according to claim 17 wherein said edge of each notch on the fixing wall forming said tongue is located close to the lateral wall.

19. A bracket according to claim 1, wherein the fixing wall is provided with a means for fixing conduit carriers other than wire mesh conduit carriers or for fixing other accessories.

20. A bracket according to claim 18, wherein said fixing means consists of at least one perforation.

21. A bracket according to claim 1, wherein a the portion of the fixing wall close to the dorsal wall is extended by a tab bent against an outer face of said dorsal wall.

22. A bracket according to claim 21, wherein a portion of the dorsal wall close to the fixing wall and coming into contact with the tab is slightly indented towards the interior of a bracket to a depth equal to the thickness of the sheet metal such that said tab, once bent, does not make the dorsal wall excessively thick.

23. A bracket according to claim 1, wherein at least one of the lateral wall and the dorsal wall is stiffened by at least one hollow embossed rib.

24. A bracket according to claim 1, wherein a dihedral angle between the lateral wall and the dorsal wall is stiffened by at least one boss across the edge.

25. A method of manufacturing a bracket according to claim 1, wherein a developed shape for the bracket is cut from sheet metal then bent, this shape being repeated in the form of a periodic pattern in the sheet metal.

26. A method of manufacturing a bracket according to claim 25, wherein an embossing operation is carried out between cutting out the sheet metal and bending to complete the forming of the different portions of the bracket.

27. A bracket for conduit carriers, said bracket being constructed of generally rigid sheet material and comprising a lateral wall of generally rigid triangular configuration and having an upper edge generally perpendicular to an inner edge, a fixing wall extending lengthwise of and perpendicular to said upper edge of said lateral wall, a dorsal wall extending lengthwise and perpendicular to said inner edge of said lateral wall and generally perpendicular to said fixing wall, a supporting rail having spaced parallel side members dimensioned to receive said dorsal wall and inner ends of said lateral wall and fixing wall therebetween, each of side members on the supporting rail including a plurality of longitudinal spaced perforations with the perforations in the side members being aligned, said fixing, lateral and dorsal walls forming a trihedron with an upper edge and an inner edge of the trihedron including bends in the sheet material to form a continuity of sheet material between said walls, said dorsal wall including a projection perpendicular to the dorsal wall, parallel to and spaced from the lateral wall and directed toward an inside of the trihedron, said projection being located close to the fixing wall, said lateral wall including a hole for alignment with perforations in said side members of said rail, a rod extending through a pair of aligned perforations and said hole for mounting the bracket on said rail, said projection having a free edge opposite the dorsal wall constituting a cam bearing edge for said rod to maintain the bracket on the rail.

* * * * *